July 15, 1924.
G. G. FLOYD
RAZOR BLADE SHARPENER
Filed Aug. 16, 1922
1,501,045
2 Sheets-Sheet 1
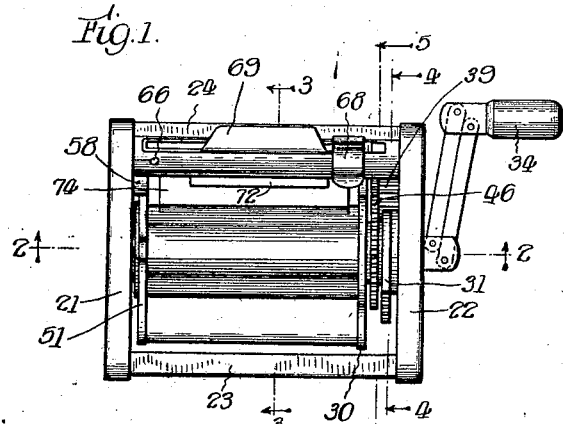
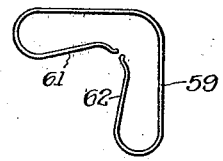
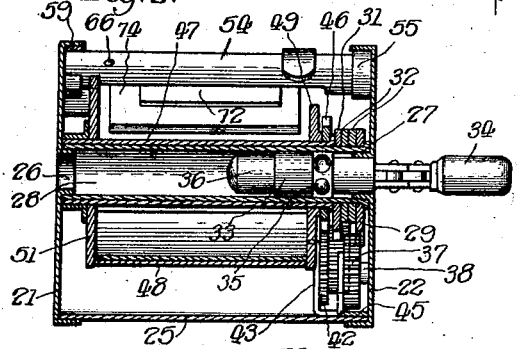
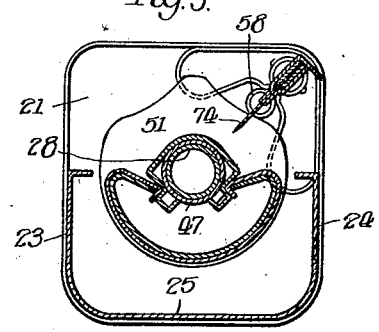
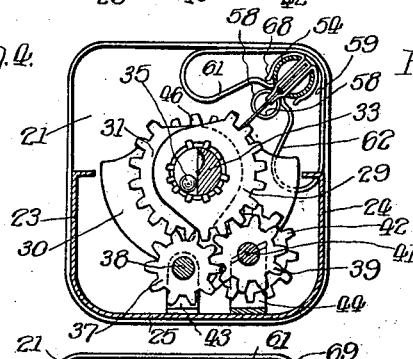
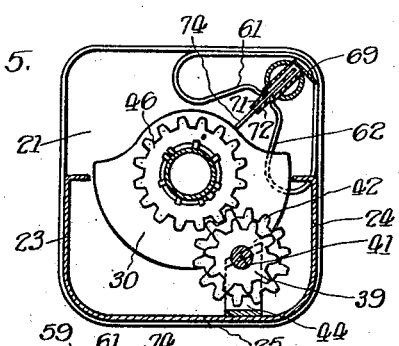
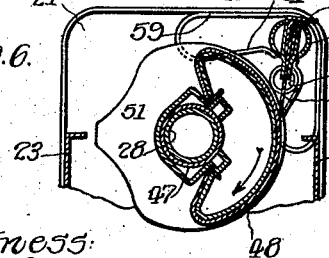
Witness
A. J. Sauer
Inventor
George G. Floyd
By Walter M. Fuller
Atty July 15, 1924.
G. G. FLOYD
RAZOR BLADE SHARPENER
Filed Aug. 16, 1922
1,501,045
2 Sheets-Sheet 2
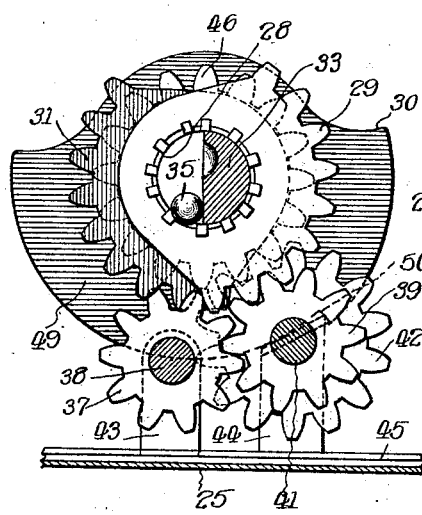
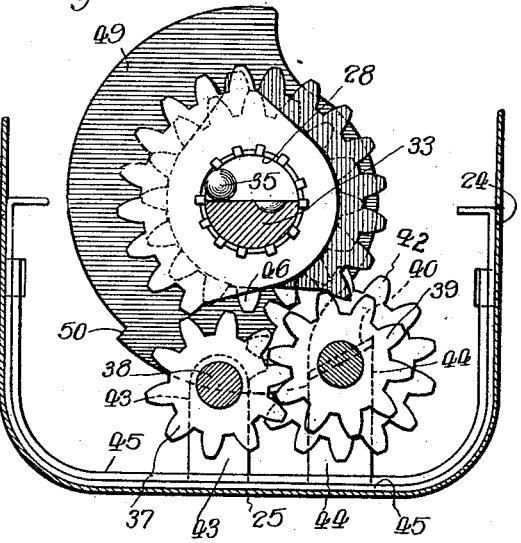
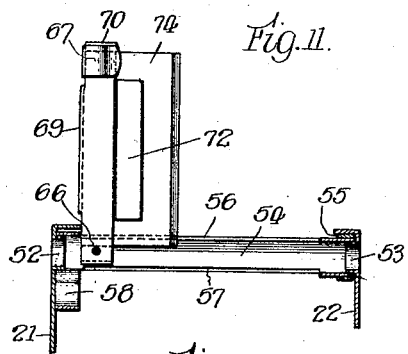
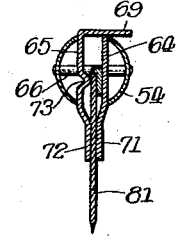
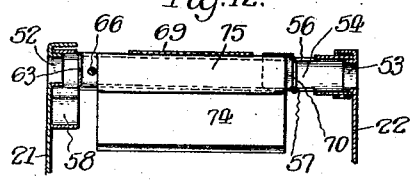
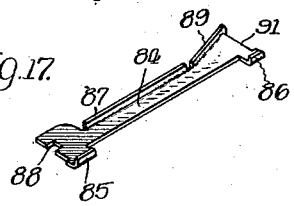
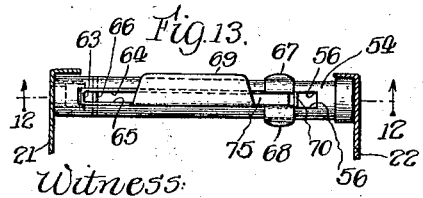
Inventor
George G. Floyd
By Walter M. Fuller
Atty.
Witness
A. J. Sauser Patented July 15, 1924.

1,501,045

UNITED STATES PATENT OFFICE.

GEORGE G. FLOYD, OF RIVERSIDE, ILLINOIS.

RAZOR-BLADE SHARPENER.

Application filed August 16, 1922. Serial No. 582,149.

*To all whom it may concern:*

Be it known that I, GEORGE G. FLOYD, a citizen of the United States, residing at Riverside, in the county of Cook and State of Illinois, have invented certain new and useful Improvements in Razor-Blade Sharpeners, of which the following is a specification.

My invention relates to simple and efficient means for stropping or sharpening razor-blades and the like, particularly though not restrictedly, those having a single cutting edge.

One aim of the invention is to provide an appliance of this character which, with a single stropping element, will automatically strop both sides of the cutting edge alternately while the handle is revolved in one direction only, whereby no especial effort is necessary on the part of the operator to be assured that the two sides of the cutting edge will be stropped in alternation equally and effectively.

A further object of the invention is the production of a device of this kind which is simple in structure, which comprises but few parts, and which may be economically manufactured.

To enable those skilled in this art to understand the structural and functional advantages accruing from the use of the invention, in the accompanying drawings, forming a part of this specification, I have illustrated a preferred embodiment of the invention, and for simplicity, like reference characters have been used for the same parts throughout the several views.

In these drawings—

Figure 1 is a plan view of the sharpener;

Figure 2 is a vertical, central section through the same on line 2—2 of Figure 1;

Figure 3 is a vertical cross-section on line 3—3 of Figure 1;

Figure 4 is a similar cross-section on line 4—4 of Figure 1;

Figure 5 is also a vertical transverse section on line 5—5, Figure 1;

Figures 6 and 7 are fragmentary views showing the blade and the stropper in different positions engaging the opposite sides of the edge of the blade to effect its sharpening action;

Figure 8 is an elevation of the spring associated with the blade-holder;

Figures 9 and 10 are detail views of the gearing for operating the oscillatory stropping-element;

Figures 11, 12 and 13 are detail views of the blade-holder and blade, Figure 12 being a longitudinal section on line 12—12 of Figure 13;

Figures 14, 15 and 16 are similar views of the blade-holder and blade, the former equipped with a filler for the different style of blade, Figure 16 being a cross-section on line 16—16 of Figure 14; and Figure 17 is a view of such filler in perspective.

Referring to these drawings, it will be seen that the appliance includes a rectangular casing comprising flanged, sheet-metal end-walls 21 and 22, and similar side-walls 23 and 24 of less height united together by an integral bottom-wall 25, whereby the upper half of the mechanism is exposed, as is clearly indicated in the various figures, the lower half of the mechanical construction being contained in the complete casing.

The two end-walls 21 and 22 have aligned, inwardly-extended, hollow hubs or bearings 26 and 27 on which is revoluble a cylindrical sleeve or tube 28 having fixed on one end thereof two gear-sectors 29 and 31, the adjacent end teeth of which slightly overlap one another and are out of register in small degree, as indicated most clearly at the top of Figure 10, these two fragmentary gear elements being spaced apart on the sleeve or hollow shaft by intervening washers or collars 32, 32.

Slidingly accommodated in this sleeve, is a shaft 33 equipped at one end with an articulated handle 34, and with a one-way ball-clutch 35, which enables the bent handle to turn the sleeve in a clock-wise direction only, the shaft, at its end opposite the handle, having a reduced-diameter section 36, with a rounded, terminal part, adapted to frictionally engage the inner surface of the corresponding hollow hub or bearing 26 when the handle is straightened out and the combined shaft and handle are slid or telescoped in the sleeve, and held therein by the mentioned friction, this general construction being described in detail and claimed in my United States Patent No. 1,304,867 granted May 27, 1919.

The gear-sector 29, during its rotation, is adapted to intermittently engage and intermesh with the teeth of a gear 37 rotatable on a stud 38 carried by an end-wall of the casing.

In somewhat similar manner, the gear-sector 31 is designed to interruptedly engage the teeth of a wider gear 39 revoluble on a shaft 41 mounted on the end wall of the casing, such gear being constantly in mesh with the teeth of the other gear 37.

This wider gear has rigid therewith, so as to be revoluble with it, a larger gear 42, these two sets of gears 37 and 39 and 42 being held from longitudinal displacement on their stationary supporting shafts by upstanding lugs 43 and 44 bent up from a metal strip or plate 45 secured in any appropriate manner in the casing, the top end of the arm or part 44 which is inclined being bent over to provide a stop shoulder 40.

Gear 42 is constantly in mesh with a gear 46 secured fixedly on an outer sleeve 47 revoluble on the inner sleeve or shaft 28, such external sleeve having fixed thereto, next to the gear 46, an end plate 49, of the shape shown in Figure 10, having on its edge a shoulder 50 acting as a stop, and having another edge 30 forming an opposed or companion stop, both of these being adapted to coact with the part 40 to limit the extent of turning of the sleeve 47 in opposite directions.

This outer sleeve 47, near its other end, has mounted thereon a cam 51 of the shape clearly indicated in Figures 3 and 6 and between the two disks 49 and 51 a metal, leather-faced, sector or substantially semi-cylindrical stropping-element 48 is provided, such part constituting what may be more or less aptly termed a mutilated or recessed cylindrical stropping-element, which, by the driving mechanism described, is adapted to be oscillated to perform the stropping operation.

Near upper corners, the two sheet-metal end-walls of the casing are provided with aligned, inwardly-extended, hollow bearings 52 and 53 (Figure 11) on which the blade-holder is mounted for oscillation.

Such blade-holder comprises a tubular or hollow cylindrical shaft 54, which, if desired, may be made of two, mating sheet-metal parts held together by an external, confining ring 55 at one end and by a hinge-pin 66 near their other ends.

Such shaft has two, opposite, longitudinal slots 56 and 57, and near its pivot-pin end, the shaft has an inwardly-extended, substantially-circular projection or lug 58 constituting a hollow, integral part of the shaft itself.

In order to hold this shaft normally so that the razor-blade 74 or 81, as the case may be, will naturally project inwardly axially toward the sleeves or hollow shafts 28 and 47, the stropping-appliance is equipped with a spring 59 of general right-angle form having two adjacent ends 61 and 62 bearing on opposite sides of the neck which connects the rounded extension 58 with the main-body of the hollow shaft 54.

Thus, if this blade-holder shaft is rocked in either direction from such normal position one or the other end of the spring 59 will be put under strain tending to return it to the neutral or intermediate position referred to.

The blade-holder proper comprises a piece of spring sheet-metal bent at 63 (Figure 13) to provide two, parallel legs 64 and 65 which are rockingly mounted on the pivot-pin 66 of the shaft 54 as is clearly illustrated.

In order to hold this pivoted blade-holder yieldingly in operative position in its shaft, the two parts 64 and 65 are each provided with the curved wings 67 and 68 adapted to clasp around the exterior of the shaft 54 as is indicated in Figures 1, 2 and 13.

In addition the section 65 has a bent-over part 69 along its top edge to assist in the proper positioning of the razor-blade in the holder and the other section 64 is fitted with a resilient end ear 70 bent transversely of the holder and adapted to overlap the corresponding end of the companion part 65.

As is indicated more clearly in Figure 16, the two, side members 64 and 65 of the blade-holder are spaced apart in the upper or outer portion of such holder, but are closer together at 71, 72 along the inner edge of the holder whereby the latter may firmly grasp the blade.

This blade-holder, as described, is adapted to accommodate a razor-blade with one sharp edge such as one of the Gem type, such a blade being of uniform thickness except along its back edge where it is provided with a backing clip 75 extending over both flat faces of the blade.

The appliance thus far described is operated as follows, the operator by grasping either the extension 69 or the clips 67 and 68, as may be most convenient, rocks the blade-holder on the pivot pin out of the shaft 54 into the position shown in Figure 11 the two parts 64 and 65 of the blade-holder due to their natural resiliency separating an adequate extent for the ready insertion of the blade.

Such blade 74 with its thicker backing 75 is introduced between the two, separated parts of the blade-holder with one end of the blade bearing on the pivot-pin 66 and the back of the blade resting against the part 69.

The holder and blade are then rocked down into the shaft 54 during which movement the two elements 64, 65 are compressed against the backing of the blade and the two parts 71 and 72 are pressed against the opposite sides of the blade proper, the blade-holder being held in correct position in the shaft by reason of the spring engagement of the two clips 67 and 68 extending part way around the exterior of the shaft.

The parts of the mechanism, including the blade, are now in the positions shown in Figures 3 and 9.

Rotation of the handle in a clockwise direction, by reason of the intermeshing of the teeth of sector 29, gear 37, gear 39, gear 42 and gear 46 effects a partial counter-clockwise rotation of the mutilated or fragmental stropping element 48.

The rounded projection 58 bearing on the cam 51 and cooperating therewith rocks the blade-holder slightly against the action of the end 61 of the spring 59 in a clockwise direction, as the holder is viewed from the handle end of the appliance, so that when the stropper during its continued turning reaches the blade the latter will be in position for proper stropping action on one side of its edge as shown in Figure 7, the edge of the blade being held with proper pressure on the stropper by reason of the action of the end 61 of the spring.

After this stropping action has been completed, although the handle 34 is always turned in a clockwise direction, the mentioned rotation of the stropping-element stops by reason of the sector 29 going out of mesh with the gear 37, overthrow or excessive turning of the stropping member being prevented by the engagement of the shoulder 30 with the fixed abutment 40 as illustrated in Figure 10.

At this time the stropper has passed slightly beyond the blade and the latter by reason of the action of the spring 59 and the shape of the cam 51 swings to normal intermediate position.

Continued turning of the handle in the same direction causes the reverse movement of the stropper by reason of the inter-action between the gear-sector 31 and the gear 39, the associated gear 37 now turning idly.

At the moment that the gear 29 ceases its co-operative relation with gear 37, sector 31 establishes active relation with its gear 39.

Thus the stropping member begins its turning in the opposite or clockwise direction, but, before it reaches the other side or edge of the blade, the blade-holder will have been rocked slightly in a counterclockwise direction against the action of the part 62 of the spring 59 by reason of the cam 51 engaging and moving the projection 58 of the blade-holder shaft, whereby the blade will be in proper position for engagement with the stropper as the latter comes around to it, whereupon continued turning of the stropper effects the sharpening of the edge of the blade as illustrated in Figure 6.

After the completion of this stropping function, the blade-holder under the influence of the spring swings the blade to the intermediate position and overthrow of the stropper is prevented by the engagement of the shoulder 50 with the stop 40.

Continued turning of the handle in the single direction causes a repetition of the actions specified so that the two sides of the single edge blade are stropped alternately as is desirable for an effective sharpening action.

It is to be observed that the handle is revolved in one direction only, which movement through the gearing specified brings about an oscillation of the mutilated or cut-away stropping member, and that the blade-holder automatically rocks to position the blade preliminarily for proper engagement with the cylindrical surface of the stropping element, the cut-away or omitted portion of the stropping member giving space for the rocking of the blade in the manner indicated.

The blade having been adequately and efficiently stropped, the turning of the handle is ended and the blade is removed from the holder in an obvious manner.

In order to adapt this blade-holder for use with blades of a different type such as a blade 81 (Figure 15) with no backing strip and with end shoulders 82 and 83, I provide a supplemental or auxiliary filler for the holder of the type and form shown in Figure 17.

This comprises a plate 84 cut away along one edge and supplied near its two ends with ledges or shoulders 85 and 86 and equipped along its opposite edge with a longitudinal flange 87 and at one end with a recess 88, near its other end with an inclined flange 89, and at such other end with a recess 91.

This filler is inserted between the two sides 64 and 65 of the blade-holder with the recess 88 receiving the pivot-pin and the recess 91 receiving the resilient ear or lug 70 which holds the filler firmly in position in the blade-holder.

The blade 81 is placed in the holder with its back edge against the flange 87 and with its shoulders 82 and 83 in engagement with the supporting ledges 85 and 86, all as is clearly shown in Figures 14 to 17 inclusive.

This filler compensates, at least in a measure, for the absence of a thickened rear portion of the blade and the part 65 may be supplied with an internal rib 73, if desired, to bear on the face of the blade.

Inasmuch as the operation of this appliance is the same with this blade as with the one already described, no further description is needed.

It is to be understood that this invention is susceptible of a variety of embodiments and that many minor mechanical changes may be incorporated in the structure depicted and described without departure from the substance and essence of the invention and without the sacrifice of any of its substantial benefits and advantages.

I claim:

1. In a razor-blade sharpener, the combination of a stropping-element, a first gear to turn said element, a rotary handle, two offset gear-sectors revolved by said handle, a revolubly-mounted second gear adapted to be intermittently engaged by one of said gear-sectors, a third gear in mesh with said second gear and adapted to be intermittently engaged by the other of said gear-sectors, an operative connection between said third gear and said first gear, and a blade-holder means, whereby turning of the handle in one direction only effects the oscillation of said stropping-element.

2. In a razor-blade sharpener, the combination of a shaft, a pair of offset gear-sectors revoluble with said shaft, means to turn said shaft in one direction only, a hollow shaft revoluble on said first shaft, a stropping element fixed to and revoluble with said hollow shaft, a pair of revolubly-mounted intermeshing gears positioned to be alternately engaged by said gear-sectors, means to transmit the rotation of one of said gears to said stropping-element, and a blade-holder to support a blade in operative relation to said stropping element.

3. In a razor-blade sharpener, the combination of a stropping-element having a mutilated cylindrical stropping surface, a pair of gear-sectors coaxial with said stropping-element, means to revolve said gear-sectors, gear means between said gear-sectors and said stropping-element to oscillate the latter, a blade-holder, and means to oscillate said blade-holder while its blade is in register with the space provided by the mutilation of said stropping-element.

4. In a razor-blade sharpener, the combination of a stropping-element having a mutilated cylindrical stropping surface, a pair of angularly-offset gear-sectors coaxial with said stropping-element, gear means between said gear-sectors and said stropping-element to oscillate the latter, a handle designed to revolve said gear-sectors in one direction only, a blade-holder, and means to oscillate said blade-holder while its blade is in register with the space provided by the multilation of said stropping-element.

5. In a razor-blade sharpener, a blade-holding means comprising in combination, a rockingly-mounted longitudinally-slotted shaft, a blade-holder normally in said slot and hinged to said shaft to permit its withdrawal for blade inserting and removal purposes, and a filler for said blade-holder adapting it for the accommodation of a different style of blade.

In witness whereof I have hereunto set my hand and seal.

GEORGE G. FLOYD. [L. S.]